United States Patent [19]
Oldaeus et al.

[11] 4,044,610
[45] Aug. 30, 1977

[54] EXCAVATORS

[75] Inventors: Karl Olof Oldaeus, Landskrona; Osten Lars Tordenmalm, Sodra Sandby; Nils Bo Nilsson, Eslov, all of Sweden

[73] Assignee: Akermans Verkstad AB, Eslov, Sweden

[21] Appl. No.: 665,699

[22] Filed: Mar. 10, 1976

[30] Foreign Application Priority Data

Mar. 12, 1975 Sweden ............................. 75027599

[51] Int. Cl.² ............................................. E02F 9/26
[52] U.S. Cl. ........................... 73/133 R; 37/DIG. 19; 172/430
[58] Field of Search ....................... 73/432 HA, 133 R; 33/354, 366, 391; 172/430; 37/DIG. 19; 116/124 F

[56] References Cited
U.S. PATENT DOCUMENTS

| 2,772,411 | 11/1956 | Cooper | 116/124 F X |
| 3,039,087 | 6/1962 | Huston | 172/430 X |
| 3,779,084 | 12/1973 | Nilsson | 73/432 HA |
| 3,900,073 | 8/1975 | Crum | 172/430 |
| 3,965,733 | 6/1976 | Hutchings et al. | 73/133 R |

Primary Examiner—Charles A. Ruehl
Attorney, Agent, or Firm—Blair & Brown

[57] ABSTRACT

Measurement devices are provided on the boom and stick of an excavator and are diposed to measure, by means of the gravitational force, the angle of the boom and the stick, respectively, relative to the horizontal plane. These measurement values are applied to an evaluation instrument which indicates the excavation depth on the basis of the length of the boom and the stick and with the help of the received values. Furthermore, means may be provided to measure the lifting force exercised by the boom ram, this measurement being also applied to the evaluation instrument whereby it can, by means of the first-mentioned measurement values, also indicate the turning moment exercised on the boom and the stick.

4 Claims, 7 Drawing Figures

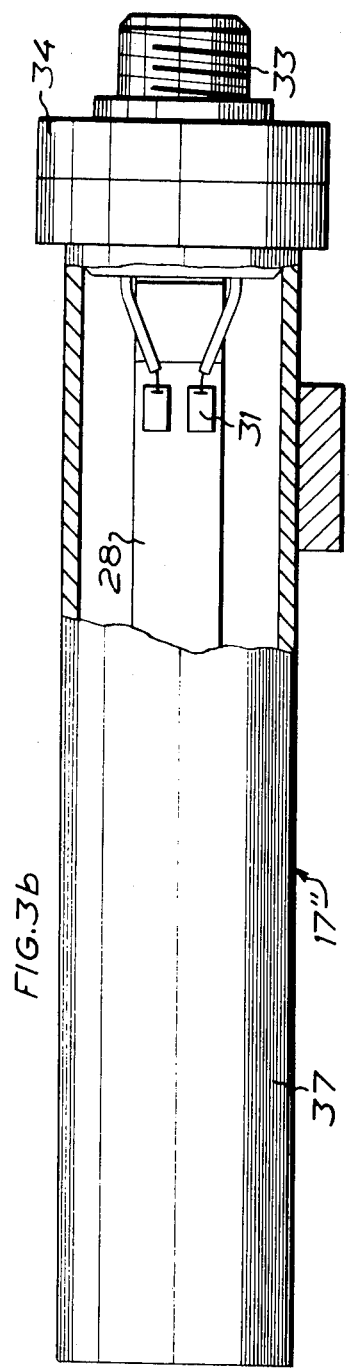
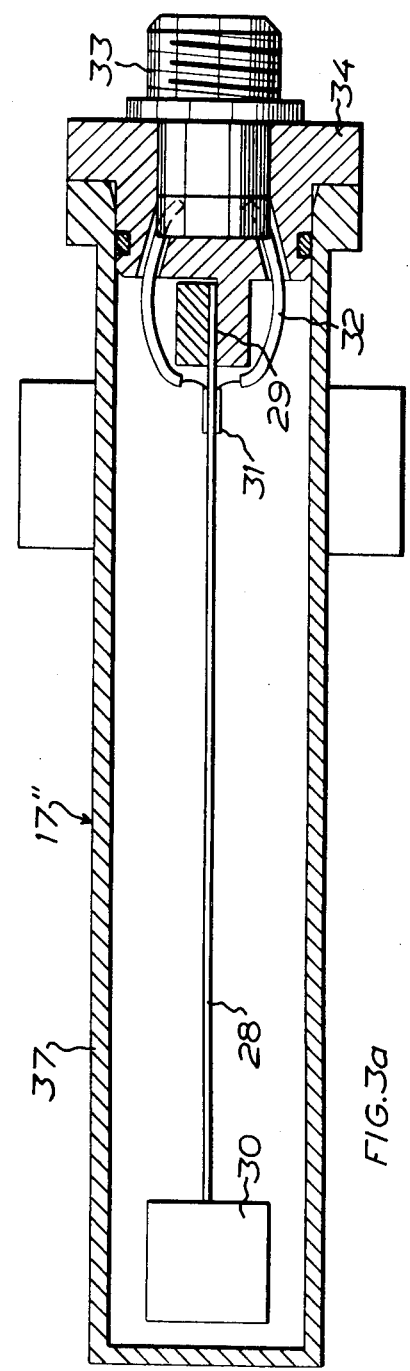

EXCAVATORS

The present invention relates to an improvement in an excavator with a chassis, a turret rotatably mounted on the chassis, and an excavation assembly mounted on the turret, including boom, stick and excavation shovel.

In excavation work with excavators of the above-described type, it is often necessary that the bottom of the excavation pit be dug to a predetermined depth. This is common in, for example, ditch-digging, excavation of house foundations and canals and under-water work. Normally, the depth is checked by means of measurement instruments handled by experts.

In later years, a new type of instrument has been developed for determining the excavation depth, such instruments are incorporated in the excavator and are capable of showing the depth in question from a certain reference point. These instruments are based on the principle of the change of air pressure with the altitude above sea level. It has proved possible to measure a depth with an accuracy of up to ± 100 mm in this manner but the measurement result becomes unreliable because of the rapid pressure changes caused by the movements of the excavation assembly, U.S. Pat. No. 3,779,084 relates to a construction of this type.

Another very urgent need in this type of excavator is to be able to measure the size of a load suspended from the shovel hook. This measurement is necessary in order to enable the driver to keep within the stability limits of the excavator, with a certain safety margin, and is normally effected such that the driver assesses the distance of the load from the center line of the excavator and then reads off from tables whether this load lies within the allowed limit. It is obvious that this system is highly unreliable as regards the handling of loads, in particular since the driver is often not fully aware of the size of the load. However, it has hitherto been difficult to produce, at reasonable price, an operationally reliable apparatus for checking the permitted load at certain extensions of the boom and the stick. German Auslegeschrift No. 2,221,419 discloses an apparatus by means of which the load lifting can be checked approximately by measurement of the angle of the boom in relation to the excavator and the hydraulic pressure in the hydraulic ram which lifts the boom, but this apparatus is still far from perfect.

The primary object of the present invention is to provide an apparatus by means of which it is possible to check, from the driver's seat, the excavation depth in question in a very simple and reliable manner.

Another object of the invention is to supplement this apparatus such that it is possible to check that load lifting is effected within permitted limits.

According to one aspect of the present invention, the improved excavator comprises angular measurement devices placed on at least the boom and the stick and arranged to measure by means of the gravitational force the angle of the the boom and the stick, respectively, relative to the horizontal plane, and an evaluation instrument to which all of the angular measurement devices are connected and which is arranged to indicate the excavation depth on the basis of the length of the boom and the stick and by means of the values received from the measurement devices.

In order that the invention and its various other features may be understood more easily, embodiments will now be explicated, by way of example only, with reference to the drawings, in which:

FIG. 2 and FIGS. 3a and 3b are cross-sections of angular measurement devices in accordance with the present invention;

Figure 1:
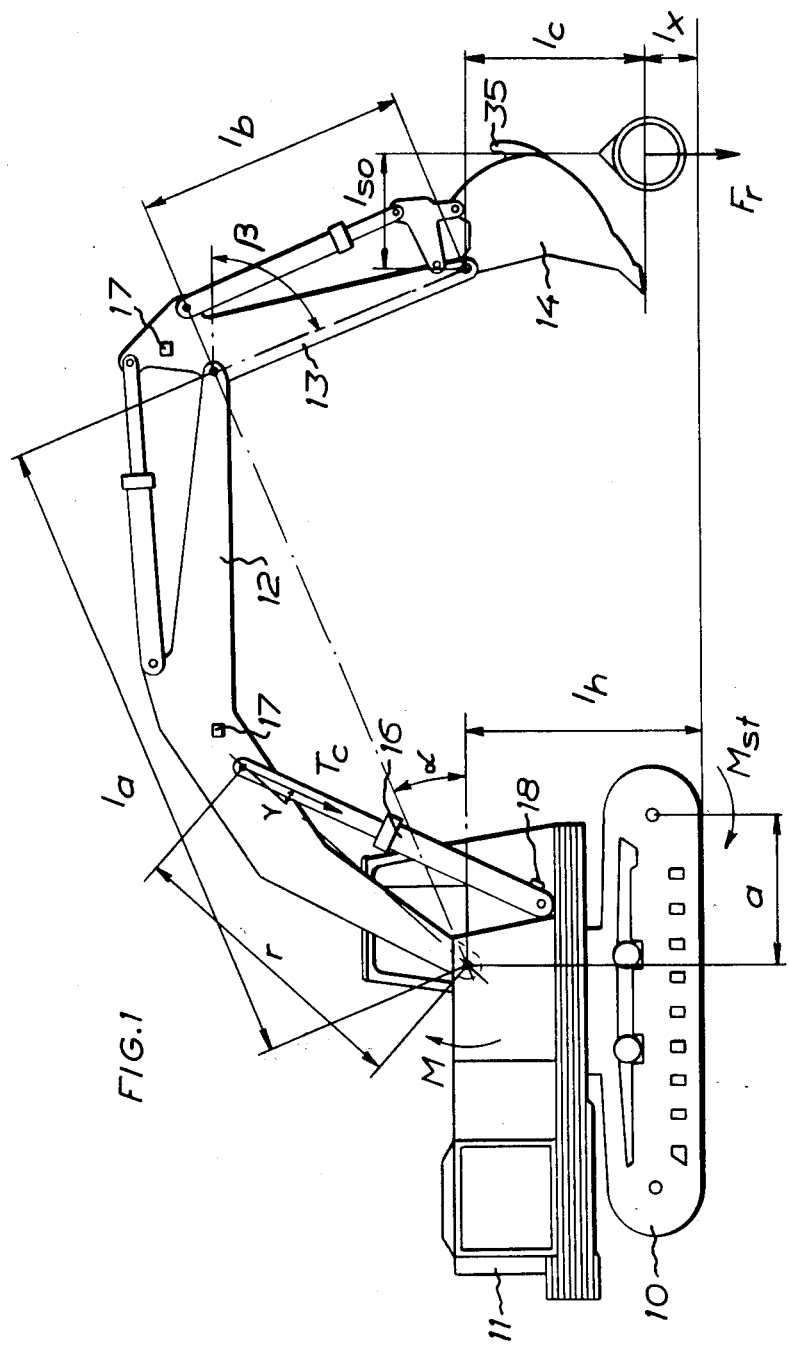
FIG. 1 is a schematic side elevation of an excavator arranged in accordance with the present invention.

FIG. 1 illustrates schematically a conventional excavator with a chassis 10, a turret 11 pivotally mounted on the chassis, a boom 12 mounted on the turret and a stick 13 pivotally connected to the boom, a shovel 14 being pivotally connected to the opposite end of the stick in relation to the boom. The boom, stick and shovel are operated in a normal manner by means of hydraulic rams.

Figure 2:
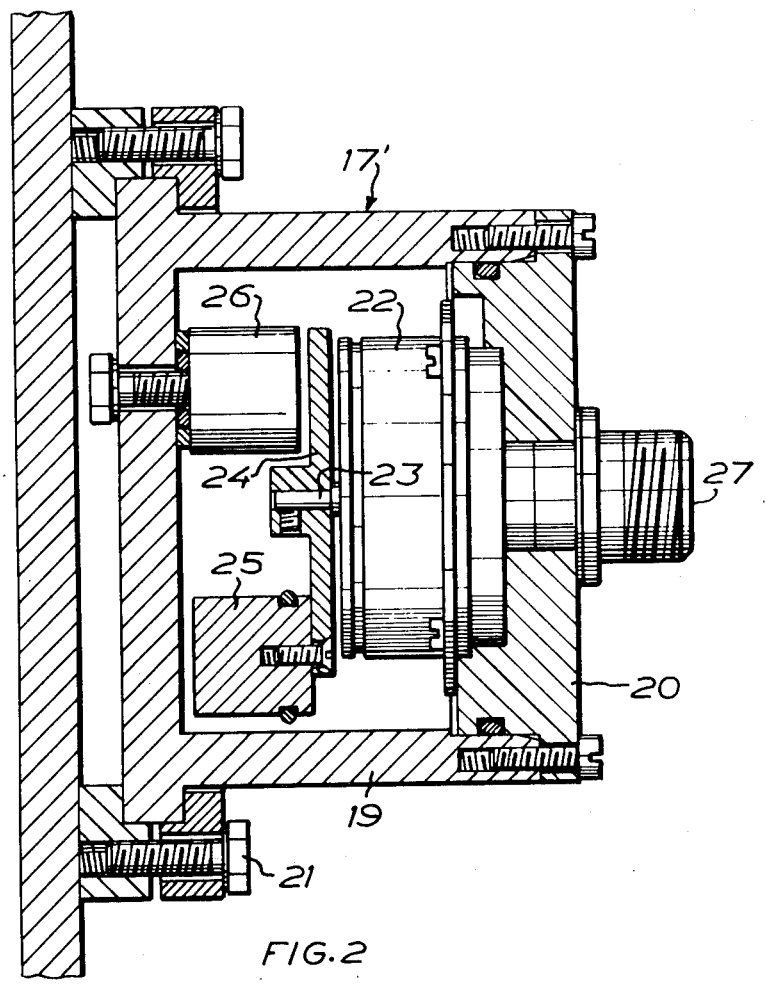

Angular measurement devices 17 are fixed to the boom 12 and the stick 13 and located such that they are not damaged when the excavator is in operation. The angular measurement devices can be of different designs, as shown in FIGS. 2 and 3a and 3b. According to FIG. 2, the angular measurement device 17' consists of a casing 19, a lid 20 fixed thereon and retainer means 21 for connecting the casing to its associated part of the excavator. A potentiometer 22 is located within the casing 19 and is fixed to the inner side of the lid 20. The potentiometer 22 has a shaft 23 onto which is fixed a plate 24. A weight 25 is attached at a point adjacent the periphery of the plate. A magnet 26 is also fixedly disposed within the casing 19. The potentiometer 22 is a so-called sine potentiometer, whose output signals are directly proportional to the sine of the angle in which the potentiometer shaft 23 and the stationary portion of the potentiometer 22 are turned relative to each other. It will be apparent from FIG. 2 that the plate 24 with the weight 25 will, because of the force of gravity, be constantly located in the same position, whereas the stationary portion of the potentiometer 22 will, because of its fixed connection to the associated part of the excavator via the lid 20, the casing 19 and the retainer means 21, be turned at different angles relative to the plate 24 dependent upon the pivotal position of the excavation assembly. Thus, it is possible, by means of the potentiometer 22 with the associated shaft with its pendulum, to determine in a simple manner the angle of the excavator assembly part relative to the horizontal plane. The magnet 26 in the casing 19 is provided to counteract the oscillations of the plate 24 with the weight 25, for which reason the casing 19 may also contain a suitable damping medium. An electric connection 27 is provided on the lid 20 for connection of the potentiometer terminals to exterior lines.

FIG. 3 shows an angular measurement device 17" of a different design. According to this figure, a flat rod 28 is, as shown at 29, fixedly connected at its one end to a casing 37 via a lid 34 fixed in one end of the casing. The rod 28 has a weight 30 at its distal end from the fixation end. Adjacent the fixation end of the rod 28, resistant strain gauges 31 are connected thereto and coupled into a full wave bridge by means of lines 32. A damping agent is provided in the casing 37 for damping the oscillations of the rod 28. The lid 34 has an electric contact 33 by means of which the bridge and the resistant strain gauges may be connected to an outer circuit. At different angular positions of that part of the excavator on which the measurement device 17" is mounted, the rod 28 with the weight will assume different angular positions relative to the longitudinal axis of the casing 37 and these angular positions are established by means of the resistant strain gauges whence output signals are obtained in the same manner as from the potentiometer according to FIG. 2.

By means of the devices according to FIGS. 2 and 3, it is possible to establish in a simple way the angular position of the boom 12 and the stick 13 independent of the angular position of the chassis 10 and the turret 11 of the excavator. Naturally, it should be possible to place an angular measurement device 17 also on the shovel 14 in order to obtain an exact value, but this device would then be exposed to substantial stresses during excavation work, for which reason it is preferable to refrain from such a provision and instead approximate the shovel angle relative to the stick with only slight error. The measurement values obtained by means of the angular measurement devices 17 of the boom and the stick are utilized to measure the excavation depth in accordance with the following description. It will be apparent from FIG. 1 that a number of constant units are present, viz., the values $1_a$, $1_b$, $1_c$ and $1_h$, which represent the length of the boom and the stick between the joints, the pivot radius of the shovel and the height of the boom fixation point above the substrate. Information concerning the excavation depth (which is designated $1_x$) is then obtained in accordance with the following equation:

$$1_x = 1_h + 1_2 \sine \alpha + 1_b \sine \beta - 1_c = 1_a \sine \alpha + 1_b \sine \beta + \text{constant}.$$

It should be observed that the angle $\beta$ in FIG. 1 is negative, for which reason the expression $1_b \sine \beta$ will similarly be negative.

Figure 4:
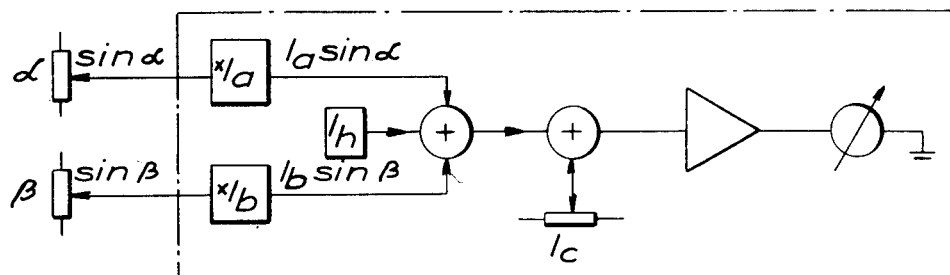
FIGS. 4 and 5 show, in the form of connection diagrams, how the measurement devices used in the apparatus according to the present invention are connected in suitable circuits.

In order to make it possible repidly to establish the excavation depth, the output signals from the measurement devices 17 can be fed into a suitable circuit, as shown in FIG. 4. It is apparent from FIG. 4 that the output signals are first amplified in proportion to the respective length of each assembly part, whereupon they are added to $1_h$. By means of the linear potentiometer $1_c$ shown in FIG. 4, the reference level (zero level) can be selected within the entire reach of the excavator. The signals are then led to a drive step and thence to a display instrument or a digital panel calibrated in meters.

Figure 6:
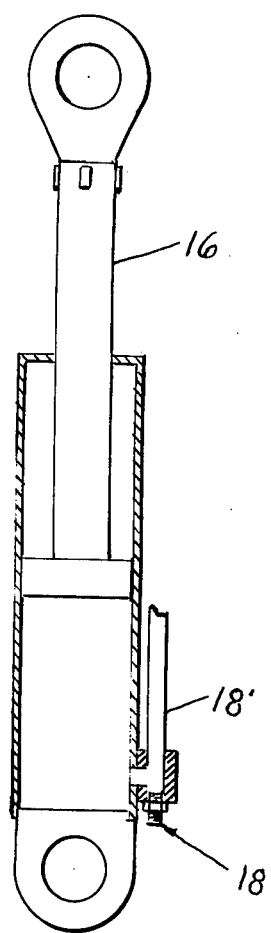
FIG. 6 shows an enlarged view of a hydraulic plunger and means attached to measure the lifting force.

By a simple supplementation, the measurement devices 17 can also be utilized for calculating the overturning moment $M_{st}$ which is exercised on the excavator on loading of the shovel 14, for example, on load lifting by means of the shovel hook 35. The supplementation which is necessary is to provide a measurement device for measuring the lifting power of the hydraulic boom as shown in FIG. 6, wherein an attachment 18 is connected to the hydraulic plunger 16, and the hydraulic pressure is fed through a pipe 18' to an indicating device (not shown) ram as shown in FIG. 6, wherein an attachment 18 is connected to the boom ram 16, and the hydraulic pressure is fed through a pipe 18' to an indicating device (not shown). Preferably, a further angular measurement device is also provided at the upper end of the boom ram (not shown). The lifting force of the boom ram can, as shown in FIG. 1, be measured by a measurement device in the lower end of the boom ram 16 but a force transducer is preferably applied to the piston rod of the boom ram.

The overturning moment $M_{st}$ is calculated with reference to FIG. 1 in accordance with the following points. The constant units utilized in this case are the boom length $1_a$, the stick length $1_b$, the distance $r$ from the boom fixation point to the piston rod joint of the boom ram and the horizontal distance $a$ from the boom fixation point to the tilting point. The moment caused by a downwardly directed force $F_r$ exercised in the shovel 14, including the natural weight of the assembly, is $$M = T_c \times r \times \sine \gamma$$

$T_c$ is the pressure force of the boom ram and $\gamma$ is the angle between the longitudinal direction of the boom ram and a straight line between the boom fixation point and the piston rod joint, this angle $\gamma$ being measured by means of the above-mentioned extra angular measurement device.

It is supposed that the above-indicated moment M is caused by the resultant force $F_R$ in the shovel hook 35, so that
$$M = F_r(1_a \cos \alpha + 1_b \cos \beta + 1_{so}) = F_r U$$
wherein $1_{so}$ is the horizontal distance between the outer stick joint and the shovel hook 35.

The overturning moment $M_{st}$ will then be $$M_{st} = F_r(u - a) = M/U (U - a) = M(1 - (a/U))$$
$$M_{st} = kT_c \sine \gamma (1 - a/1_a \cos \alpha + 1_b \cos \beta + 1_{so})$$

wherein $T_c$ is the pressure in the boom ram cylinder and $k$ includes the piston surface, friction (which is taken to be as constant) and $r$.

Figure 5:
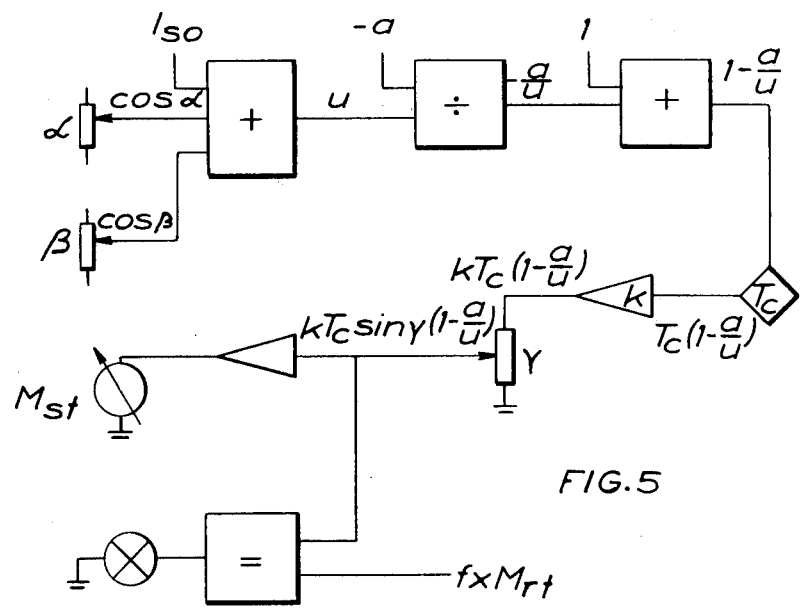

As was the case in the measurement of the excavation depth, output signals are obtained by means of the angular measurement devices 17 and, with reference to FIG. 5, the cosine values are utilized for the moment measurement, these values being, together with a value representing $1_{so}$, added to the value U. The value for $a$ which, with reference to FIG. 1, is negative, is applied to a dividing step as is the value for U, whereby the value $- (2/U)$ is obtained. In the next step the value $1 - (a/U)$ is formed and this value is applied to a pressure transducer, a multiplication being obtained and this signal being fed in turn to a sine potentiometer for the angle $\gamma$, a multiplication being also obtained here. The final signal controls, by the intermediary of a drive step, a display instrument which thus indicates the overturning moment. As shown at the bottom of FIG. 5, a comparator can be connected which compares the overturning moment with the righting moment $M_{at}$ a lamp being lit when $M_{st}$ is equal to or greater than $f \times M_{at}$ in which f is a safety factor.

It is apparent from the above description that it is possible, by simple devices to ascertain in a reliable manner the current excavation depth; and that it is possible, by a simple complementing of such devices, to obtain an indication of the overturning moment exercised on the excavator on loading of the excavator shovel.

What we claim and desire to secure by Letters Patent is:

1. In an excavator, including a chassis, a turret rotatable relative thereto, and an excavation assembly mounted on said turret and including a boom, a stick and a shovel, the improvement comprising angular measurement devices placed on at least the boom and the stick and arranged to measure, by means of the gravitational force, the angle of the boom and the stick, respectively, relative to the horizontal plane, and an evaluation instrument to which all of the angular measurement devices are connected and which is arranged to indicate the excavation depth on the basis of the length of the boom and the stick and by means of the values received from the measurement devices.

2. The improvement of claim 1, wherein the angular measurement devices consist of pendulum potentiometers whose output signals are directly proportional to the sine of the angle of the boom and the stick, respectively, to the horizontal plane.

3. The improvement of claim 1, wherein said angular measurement devices comprise levers fixedly attached in, but freely projecting from, the boom and the stick and loaded with a weight at their free end, and resistant strain gauges attached adjacent the anchorage points of said levers.

4. In an excavator including a chassis, a turret rotatable relative thereto, and an excavation assembly mounted on said turret and including a boom, a stick and a shovel, the improvement comprising angular measurement devices placed on at least the boom and the stick and arranged to measure, by means of the gravitational force, the angle of the boom and the stick, respectively, relative to the horizontal plane, means for measuring the lifting force exercised by a hydraulic ram provided for operating the boom, and an evaluation instrument to which all of the measurement devices are connected, as is said means for measuring said lifting force, said evaluation instrument being arranged to indicate the turning moment exercised on said boom and said stick.

* * * * *